No. 852,074. PATENTED APR. 30, 1907.
A. MORRISON.
MEASURING ATTACHMENT FOR BOTTLE STOPPERS.
APPLICATION FILED AUG. 31, 1906.
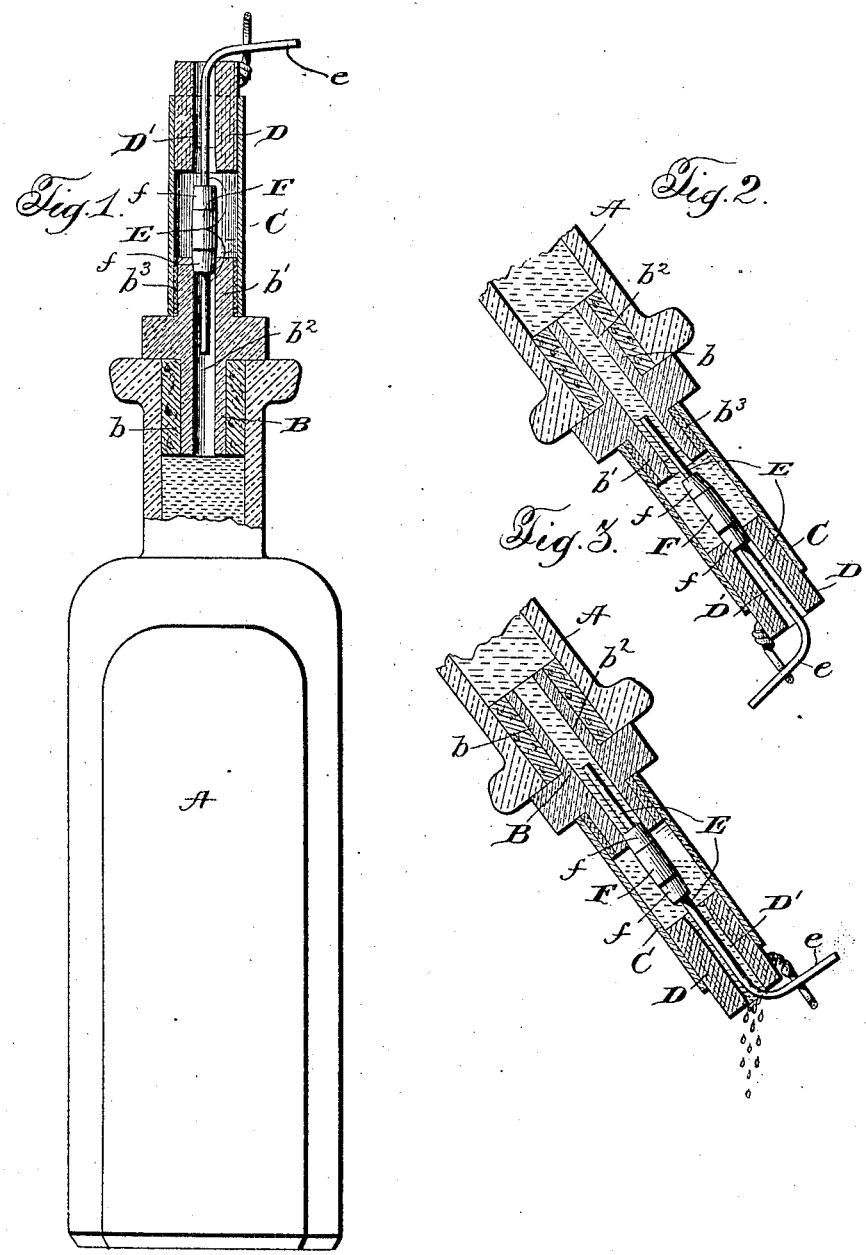
Witnesses:
Jas. E. Hutchinson.
C. A. Krey.
Inventor:
Alexander Morrison,
By M. V. Tierney, Attorney.

UNITED STATES PATENT OFFICE.

ALEXANDER MORRISON, OF SHOSHONE, IDAHO.

MEASURING ATTACHMENT FOR BOTTLE-STOPPERS.

No. 852,074.        Specification of Letters Patent.        Patented April 30, 1907.

Application filed August 31, 1906. Serial No. 332,843.

*To all whom it may concern:*

Be it known that I, ALEXANDER MORRISON, a citizen of the United States, residing at Shoshone, in the county of Lincoln and State of Idaho, have invented certain new and useful Improvements in Measuring Attachments for Bottle-Stoppers, of which the following is a specification.

This invention relates to an improvement in devices for measuring a specific quantity of medicine or other liquid which is contained in bottles, and the object of the present invention is the provision of a device of this character which when not in use as a measuring vessel, will serve the purpose of the usual bottle stopper.

A further object of the invention is the provision in a device of this character of means for regulating the amount of liquid measured thereby.

Other objects of the invention will be apparent from the detailed description hereinafter, when read in connection with the accompanying drawing forming a part hereof, wherein like numerals of reference refer to similar parts in the several views and wherein a preferable embodiment of my invention is shown.

In the drawings: Figure 1 is a longitudinal section of a bottle equipped with my improved device. Fig. 2 is a longitudinal section of the neck of a bottle having my improved measuring device attached thereto, the valve being shown as occupying a position to prevent the discharge of liquid from the measuring device, and, Fig. 3 is a similar view, the valve being shown as occupying a position whereby communication between the bottle and measuring device is cut off and whereby the liquid shown in the measuring device may be discharged therefrom.

Referring now more particularly to the drawings, A designates a bottle of any suitable construction, in the neck of which is secured a stopper B, which is preferably formed of glass or other non-corrosive material. The stopper B is provided with a cylindrical portion $b$, which is preferably provided with a covering of cork or rubber, and is adapted to engage the neck of the bottle and with an upwardly extending cylindrical portion $b'$, for a purpose to be hereinafter more particularly set forth. The stopper B is provided with an opening $b^2$ therein, which extends longitudinally therethrough.

C designates an open-ended cylinder, which constitutes the measuring chamber of my improved device. The lower end of said cylinder is adapted to snugly engage the upper cylindrical portion $b'$ and said cylindrical portion is preferably provided with a gasket $b^3$, preferably of rubber, so as to form a tight fit with the interior of the cylinder C and at the same time permit said cylinder to be adjusted longitudinally of said cylindrical portion, for a purpose to be hereinafter more particularly set forth.

The upper portion of the measuring cylinder C is closed by a plug D of any impervious material which is provided with an opening D' extending longitudinally therethrough, which is in alinement with the opening $b^2$ extending longitudinally through the stopper B.

E designates a valve rod which passes through the openings $b^2$ and D' in the stopper B and plug D and terminates at its upper end in a laterally bent handle $e$. Secured to the portion of the valve rod E within the measuring chamber C is a valve F, the opposite ends of which terminate in conical portions $f$, which are adapted to engage the openings in the top of the cylindrical portion $b'$ of the stopper B and in the bottom of the plug D. said valve being of such a length that only one of said openings may be closed at a time. The laterally bent handle $e$ of the valve rod E pass through an elongated loop secured to the plug D so that while the valve rod is free to move longitudinally it is held against lateral movement and the handle thereof may be readily engaged by the finger of the user of the device.

Having described the construction of my improved device, I will now set forth the manner of using the same. With the bottle occupying its normal position, the device constitutes an ordinary stopper therefor, the valve F being maintained by gravity in such a position that the lower conical shaped end $f$ thereof will engage the opening in the top of the cylindrical portion $b'$ of the stopper B and thereby prevent the evaporation of the liquid contained in the bottle. When, however, it is desired to obtain a dose of liquid from the bottle, the same is inverted which will cause the valve F to uncover the opening in the cylindrical portion $b'$ of the stopper and to fall by gravity and close the opening in the plug D. The liquid will then flow from the bottle into the measuring cylinder C through the opening $b^2$ in the stopper B. When it is desired to discharge the contents of the measuring cylinder C, the bottle is still maintained in its inverted position and the valve stem E is elevated a sufficient amount to cause the valve F to close the opening in the cylindrical portion $b'$ of the stopper B and to uncover the opening in the plug D, thereby permitting the liquid contained in the measuring cylinder C to flow through said opening and into a spoon or suitable vessel. It will be apparent that inasmuch as the lower end of the measuring cylinder is closed by the cylindrical portion $b'$ of the stopper B and as said cylinder is longitudinally adjustable on said cylindrical portion, the capacity of said cylinder may be varied to obtain a dose of any desired quantity. The lower end of the cylinder C is preferably provided with a series of graduations so that by shifting the cylinder to bring any of said graduations into alinement with the upper end of the cylindrical portion $b'$ of the stopper B, the capacity of the measuring cylinder may be readily adjusted to any desired amount.

I do not desire to limit myself to the precise form and construction shown in the drawing, as it is obvious that many minor changes may be made thereto without departing from the spirit of the invention.

I claim:

1. In a device of the character described, a stopper adapted to be secured in the neck of a bottle and having an opening extending longitudinally therethrough, a measuring chamber adjustable to various capacities carried by said stopper and provided with an outlet opening, a valve for alternately opening and closing the opening in the stopper and the outlet opening of the measuring chamber, and means without the measuring chamber for actuating said valve.

2. In a device of the character described, a stopper adapted to be secured in the neck of a bottle and provided with a portion extending upwardly therefrom, a measuring chamber fitting said portion and longitudinally adjustable thereon, and means controlling the entrance of the liquid from the bottle into said measuring chamber and its discharge therefrom.

3. In a device of the character described, a bottle stopper provided with an upwardly extending cylindrical portion and with an opening extending longitudinally therethrough, a measuring cylinder fitting said cylindrical portion of the stopper and adjustable thereon, said measuring cylinder being provided with a discharge opening, and means for alternately opening and closing the opening in the bottle stopper and the discharge opening of the measuring cylinder.

4. In a device of the character described, a bottle stopper provided with an upwardly extending cylindrical portion and with an opening extending longitudinally therethrough, a measuring cylinder fitting said cylindrical portion of the stopper and adjustable thereon, said measuring cylinder being provided with a discharge opening, and a valve for alternately opening and closing the opening in the bottle stopper and the discharge opening of the measuring cylinder.

5. In a device of the character described, a bottle stopper provided with an upwardly extending cylindrical portion and with an opening extending longitudinally therethrough, a measuring cylinder fitting the cylindrical portion of the stopper and adjustable thereon, said measuring cylinder being provided with a discharge opening in the top thereof, a vertically movable valve rod loosely mounted in the openings in the top of the measuring cylinder and in the bottle stopper, and a valve carried by said valve rod for alternately opening and closing the openings in the bottle stopper and in the top of the measuring cylinder.

6. In a device of the character described, a measuring chamber adjustable to various capacities provided with openings permitting the admission of liquid thereto and its discharge therefrom, a valve within the chamber for alternately opening and closing said openings, and a valve rod for operating said valve, said rod having an actuating portion extending without the measuring chamber.

In testimony whereof I have signed my name to this specification in the presence of two subscribing witnesses.

ALEXANDER MORRISON.

Witnesses:
BERT BOWLER,
W. D. FORBES.